United States Patent
Sasada et al.

(10) Patent No.: US 9,250,469 B2
(45) Date of Patent: Feb. 2, 2016

(54) POLARIZER AND LIQUID-CRYSTAL DISPLAY DEVICE

(71) Applicant: FUJIFILM Corporation, Tokyo (JP)

(72) Inventors: Yasuyuki Sasada, Kanagawa (JP); Mitsuo Osato, Kanagawa (JP); Kazuya Hisanaga, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 36 days.

(21) Appl. No.: 14/324,608

(22) Filed: Jul. 7, 2014

(65) Prior Publication Data

US 2015/0009458 A1 Jan. 8, 2015

(30) Foreign Application Priority Data

Jul. 5, 2013 (JP) .................. 2013-141733
May 26, 2014 (JP) .................. 2014-108602
Jun. 30, 2014 (JP) .................. 2014-134558

(51) Int. Cl.
*G02F 1/1335* (2006.01)
*G02B 5/30* (2006.01)
*G02F 1/13363* (2006.01)

(52) U.S. Cl.
CPC ........ *G02F 1/133528* (2013.01); *G02B 5/3033* (2013.01); *G02F 1/13363* (2013.01)

(58) Field of Classification Search
CPC .......... G02F 1/133528; G02F 1/13363; G02B 5/3033
See application file for complete search history.

(56) References Cited

U.S. PATENT DOCUMENTS

| 8,331,025 B2 | 12/2012 | Kobayashi et al. | |
|---|---|---|---|
| 2008/0254236 A1* | 10/2008 | Kawanishi | C08J 5/18 428/1.1 |
| 2010/0232018 A1 | 9/2010 | Kobayashi et al. | |

FOREIGN PATENT DOCUMENTS

| JP | 2009-122663 A | 6/2009 |
|---|---|---|
| JP | 2012-063748 A | 3/2012 |

* cited by examiner

*Primary Examiner* — Wen-Ying P Chen
(74) *Attorney, Agent, or Firm* — Jean C. Edwards, Esq.; Edwards Neils PLLC

(57) ABSTRACT

A polarizer having at least one optical film and at least one polarizing film, wherein the absolute value of the photoelastic coefficient C of the optical film is $2 \times 10^{-12}$ $Pa^{-1}$ or more, the optical film has an in-plane direction in which the sound propagation velocity is the maximum, and the angle between the in-plane direction in which the sound propagation velocity through the optical film is the maximum and the direction of the absorption axis of the polarizing film falls within a range of from 0° to less than 45°, is excellent in working aptitude and can prevent optical unevenness of the liquid-crystal display device accompanied by environmental changes.

12 Claims, No Drawings

POLARIZER AND LIQUID-CRYSTAL DISPLAY DEVICE

CROSS-REFERENCE TO RELATED APPLICATIONS

This application claims the benefit of priority from Japanese Patent Application No. 2013-141733, filed Jul. 5, 2013, Japanese Patent Application No. 2014-108602, filed May 26, 2014, and Japanese Patent Application No. 2014-134558, filed Jun. 30, 2014, the disclosures of which applications are incorporated by reference herein in their entirety.

BACKGROUND OF THE INVENTION

1. Field of the Invention

The present invention relates to a polarizer and a liquid-crystal display device.

2. Background Art

A polarizer is an essential member that constitutes a liquid-crystal display device. An ordinary polarizer has a configuration in which an optical film is stuck to one or both surfaces of a polarizing film of a polyvinyl alcohol (PVA) resin processed for adsorption orientation with a dichroic dye such as an iodine complex or the like. For recent liquid-crystal display devices, technology of body thinning and panel enlarging is being much promoted, and a problem of optical unevenness occurring on the surfaces of liquid-crystal display devices along with environmental changes has become obvious.

Also for the polarizer that is an essential member of a liquid-crystal display device, technology of thinning and enlarging the plate is being promoted, the current situation is that polarizer deformation, if any, would cause panel display failure. Concretely, when a polarizer expands or shrinks, the liquid-crystal panel stuck to the polarizer would deform, and apart from this, a backlight member may also deform, and as a result, it is considered that the panel and the backlight member would be kept in contact with each other to cause optical unevenness.

For solving the problems, there have been proposed a system of using an optical film comprising an acrylic resin (JP-A 2009-122663), a system of reducing the retardation change (ΔRth) accompanied by environmental changes of optical films as device members (JP-A 2012-63748), etc.

As a result of assiduous studies, the present inventors have found that the synthetic resin film of an acrylic resin film as disclosed in JP-A 2009-122663 is unsatisfactory in point resistance to brittleness, and consequently, when worked into chips, peeling and cracking would occur at the cut edges of the film, and as a result, the worked polarizers of the film would generate debris at the cut edges thereof therefore causing display performance degradation.

On the other hand, it has been known that the optical film disclosed in JP-A2012-63748 has a lowered modulus of elasticity, and consequently, when the optical film is wound up as a roll, blocking may occur, and the deformation may remain still after working to produce polarizers, and as a result, there may occur display performance degradation relating to optical unevenness (in other words, brightness unevenness) at the time of black level of display in observation of at the front of display devices. In addition, it has also been known that the optical unevenness could not be fundamentally solved merely by reducing ΔRth of the optical films as device members, and it is necessary to reduce ΔRth (pol) of the optical film in polarizers.

The technical problem with the invention is to provide a polarizer which is excellent in working aptitude such as blanking aptitude or the like, and which, when mounted on a liquid-crystal display device, can prevent optical unevenness of the liquid-crystal display device accompanied by environmental changes.

SUMMARY OF THE INVENTION

The present inventors have found that the above-mentioned problems can be solved by using an optical film having a photo-elastic coefficient on a predetermined level or more for improving the resistance to brittleness thereof and improving the modulus of elasticity thereof, by making the optical film have an in-plane direction in which the sound propagation velocity could be the maximum, and by so controlling the angle between the in-plane direction in which the sound propagation velocity through the optical film could be the maximum and the direction of the absorption axis of the polarizing film combined with the optical film as to fall within a specific angle range, and have completed the present invention.

The inventors have further found that, for improving the resistance to brittleness of the optical polymer and the modulus of elasticity thereof, a polymer having a large photo-elastic coefficient is used as the polymer to constitute the optical film, whereby the resistance to brittleness and the modulus of elasticity of the optical film can be improved. It is presumed that the polymer having a large photo-elastic coefficient may have a large dipolar moment and therefore the interaction between the polymer molecules would be strong.

When the resistance to brittleness and the modulus of elasticity are improved in the manner as above, then the photo-elastic coefficient of the polymer may increase and, owing to the internal stress derived from the dimensional change difference between the optical film and the polarizing film, ΔRth (pol) may increase; however, it is presumed that, by so controlling the angle between the direction of the optical film in which the sound propagation velocity is the maximum and the direction of the direction of the absorption axis of the polarizing film as to fall within a range of from 0° to less than 45°, the internal stress to be derived from the dimensional change difference between the optical film and the polarizing film that may occur along with environmental changes can be reduced, and ΔRth (pol) of the optical film in polarizers can be reduced. As a result that ΔRth (pol) of the optical film in polarizers can be reduced, it is possible that, when the optical film of the type is mounted on a liquid-crystal display device, it can prevent optical unevenness of the liquid-crystal display device even in environmental changes.

Consequently, the present invention that provides the specific means for solving the above-mentioned problems is as follows.

(1) A polarizer comprising at least one optical film and at least one polarizing film;

wherein the absolute value of the photo-elastic coefficient C of the optical film is $2 \times 10^{-12}$ Pa$^{-1}$ or more, the optical film has an in-plane direction in which the sound propagation velocity is the maximum, and the angle between the in-plane direction in which the sound propagation velocity through the optical film is the maximum and the direction of the absorption axis of the polarizing film falls within a range of from 0° to less than 45°;

and wherein the photo-elastic coefficient C of the optical film is a value measured in an environment at 25° C. and a relative humidity of 60%, at a wavelength of 590 nm, and the sound propagation velocity is a value measured in an environment at 25° C. and a relative humidity of 60%.
(2) The polarizer according to (1), wherein the absolute value of the humidity dependence of the thickness-direction retardation, ΔRth, of the optical film is 20 nm or less.
(3) The polarizer according to (1) or (2), wherein the optical film satisfies a relationship of the following formula (1):

$$C \times \Delta Rth > 0 \quad (1)$$

wherein C indicates the photo-elastic coefficient of the optical film, and the photo-elastic coefficient C of the optical film is a value measured in an environment at 25° C. and a relative humidity of 60%, at a wavelength of 590 nm, and ΔRth indicates the humidity dependence of the thickness-direction retardation, Rth, of the optical film.
(4) The polarizer according to any one of (1) to (3), wherein the ratio of the sound propagation velocity in the in-plane direction of the optical film in which the sound propagation velocity through the optical film is the maximum and that in the direction orthogonal to the in-plane direction of the optical film in which the sound propagation velocity through the optical film is the maximum, or that is, the ratio of sound propagation velocity in the maximum direction/sound propagation velocity in the orthogonal direction is 1.1 or more.
(5) The polarizer according to any one of (1) to (4), wherein the thickness of the optical film is from 10 to 50 μm.
(6) The polarizer according to any one of (1) to (5), wherein the optical film is composed of a cellulose acylate resin or a cyclic polyolefin resin.
(7) The polarizer according to any one of (1) to (6), wherein the absolute value of the photo-elastic coefficient C of the optical film in the direction thereof in which the sound propagation velocity is the maximum is $2 \times 10^{-12}$ $Pa^{-1}$ or more, and wherein the photo-elastic coefficient C of the optical film is a value measured in an environment at 25° C. and a relative humidity of 60%, at a wavelength of 590 nm.
(8) The polarizer according to any one of (1) to (7), wherein the absolute value of the photo-elastic coefficient C of the optical film in the direction orthogonal to the in-plane direction in which the sound propagation velocity through the optical film is the maximum is $2 \times 10^{-12}$ $Pa^{-1}$ or more, and wherein the photo-elastic coefficient C of the optical film is a value measured in an environment at 25° C. and a relative humidity of 60%, at a wavelength of 590 nm.
(9) A liquid-crystal display device containing a liquid-crystal cell and a polarizer according to any one of (1) to (8).
(10) The liquid-crystal display device according to (9), wherein the optical film is arranged between the polarizing film and the liquid-crystal cell.
(11) The liquid-crystal display device according to (9) or (10), which further has a back light and in which the polarizer is arranged on the back light side or on the viewing side.
(12) The liquid-crystal display device according to any one of (9) to (11), wherein the liquid-crystal cell is a VA-mode or IPS-mode cell.

According to the present invention, it has become possible to provide a polarizer which is excellent in working aptitude such as blanking aptitude or the like, and which, when mounted on a liquid-crystal display device, can prevent optical unevenness of the liquid-crystal display device accompanied by environmental changes. In addition, the invention has made it possible to provide at a high yield, a liquid-crystal display device using the polarizer, which can overcome optical unevenness and which is excellent in reliability/

MODE FOR CARRYING OUT THE INVENTION

The contents of the invention are described in detail. The description of the constitutive elements of the invention given hereinunder is for some typical embodiments of the invention, to which, however, the invention should not be limited. In this description, the numerical range expressed by the wording "a number to another number" means the range that falls between the former number indicating the lower limit of the range and the latter number indicating the upper limit thereof.

In this description, the lengthwise direction of film means, in the condition where the film is incorporated in a polarizer, the direction thereof that is parallel to the direction of the absorption axis of the polarizing film in the polarizer. As described below, the lengthwise direction of film is preferably parallel to the direction thereof in which the sound propagation velocity is the maximum. The in-plane direction in which the sound pabsorpropagation velocity is the maximum is preferably parallel to the film conveying direction (machine direction, MD) in production of the optical film.

The widthwise direction of film means, in the condition where the film is incorporated in a polarizer, the direction orthogonal to the direction of the absorption axis of the polarizing film in the polarizer. The widthwise direction of film is preferably orthogonal to the direction thereof in which the sound propagation velocity is the maximum. The direction orthogonal to the in-plane direction in which the sound propagation velocity is the maximum is preferably parallel to the direction orthogonal (perpendicular) to the film conveying direction (transverse direction TD) in production of the optical film.

Of the optical film for use in the polarizer of the present invention, in case where the film lengthwise direction is parallel to the direction thereof in which the sound propagation velocity is the maximum, and where the direction thereof in which the sound propagation velocity is the maximum is parallel to the MD direction, then the film MD direction is the film lengthwise direction and the film TD direction is the film widthwise direction.

In this description, a case of two parallel lines includes not only a case where the angle between the two lines is 0° but also any other case that includes an optically acceptable error. Concretely, a case of two parallel lines preferably means that the angle between the two lines is 0°±10°, more preferably means that the angle between the two lines is 0°±5°, even more preferably means that the angle between the two lines is 0°±1°. Similarly, a case where two lines are orthogonal (perpendicular) to each other includes not only a case where the angle between the two lines is 90° but also any other case that includes an optically acceptable error. Concretely, a case where two lines are orthogonal (perpendicular) to each other preferably means that the angle between the two lines is 90°±10°, more preferably means that the angle between the two lines is 90°±5°, even more preferably means that the angle between the two lines is 90°±1°.

[Polarizer]

The polarizer of the present invention is a polarizer comprising at least one optical film and at least one polarizing film, wherein:
the absolute value of the photo-elastic coefficient C of the optical film is $2 \times 10^{-12}$ $Pa^{-1}$ or more,
the optical film has an in-plane direction in which the sound propagation velocity is the maximum, and
the angle between the in-plane direction in which the sound propagation velocity through the optical film is the maximum and the direction of the absorption axis of the polarizing film falls within a range of from 0° to less than 45°, and wherein:
the photo-elastic coefficient C of the optical film is a value measured in an environment at 25° C. and a relative humidity of 60%, at a wavelength of 590 nm, and the sound propagation velocity is a value measured in an environment at 25° C. and a relative humidity of 60%.

<Characteristics of Optical Film>
<Photo-Elastic Coefficient>

Of the optical film for use in the polarizer of the present invention, the absolute value of the photo-elastic coefficient C is $2\times10^{-12}$ $Pa^{-1}$ or more, preferably from $2\times10^{-12}$ $Pa^{-1}$ to $100\times10^{-12}$ $Pa^{-1}$, more preferably from $4\times10^{-12}$ $Pa^{-1}$ to $15\times10^{-12}$ $Pa^{-1}$, even more preferably from $5\times10^{-12}$ $Pa^{-1}$ to $12\times10^{-12}$ $Pa^{-1}$. The photo-elastic coefficient can be controlled by suitably selecting the material, and controlling it to fall within the range makes it possible to satisfy both resistance to brittleness and ΔRth (pol). Of the optical film for use in the polarizer of the present invention, the absolute value of the photo-elastic coefficient in at least one in-plane direction may be good to satisfy the above-mentioned range.

Preferably, of the optical film for use in the polarizer of the present invention, the absolute value of the photo-elastic coefficient C in any one direction of the direction of the optical film in which the sound propagation velocity is the maxim and the direction orthogonal to the direction of the optical film in which the sound propagation velocity is the maximum is $2\times10^{-12}$ $Pa^{-1}$ or more, more preferably from $2\times10^{-12}$ $Pa^{-1}$ to $100\times10^{-12}$ $Pa^{-1}$, even more preferably from $4\times10^{-12}$ $Pa^{-1}$ to $15\times10^{-12}$ $Pa^{-1}$, still more preferably from $5\times10^{-12}$ $Pa^{-1}$ to $12\times10^{-12}$ $Pa^{-1}$. The direction of the optical film in which the sound propagation velocity is the maximum is preferably the film lengthwise direction of the optical film, and the direction orthogonal to the direction of the optical film in which the sound propagation velocity is the maximum is preferably the film widthwise direction of the optical film, and therefore, it is desirable that the absolute value of the photo-elastic coefficient C of the optical film in any one direction of the film lengthwise direction and the film widthwise direction is preferably $2\times10^{-12}$ $Pa^{-1}$ or more, more preferably from $2\times10-12$ $Pa^{-1}$ to $100\times10^{-12}$ $Pa^{-1}$, even more preferably from $4\times10^{-12}$ $Pa^{-1}$ to $15\times10^{-12}$ $Pa^{-1}$, still more preferably from $5\times10^{-12}$ $Pa^{-1}$ to $12\times10^{-12}$ $Pa^{-1}$.

Of the optical film for use in the polarizer of the present invention, the absolute value of the photo-elastic coefficient C in the direction of the optical film in which the sound propagation velocity is the maximum is preferably $2\times10^{-12}$ $Pa^{-1}$ or more, more preferably from $2\times10^{-12}$ $Pa^{-1}$ to $100\times10^{-12}$ $Pa^{-1}$, even more preferably from $4\times10^{-12}$ $Pa^{-1}$ to $15\times10^{-12}$ $Pa^{-1}$ still more preferably from $5\times10^{-12}$ $Pa^{-1}$ to $12\times10^{-12}$ $Pa^{-1}$. The preferred range of the absolute value of the photo-elastic coefficient C of the optical film in the film lengthwise direction is the same as the preferred range of the absolute value of the photo-elastic coefficient C of the optical film in the in-plane direction in which the sound propagation velocity through the film is the maximum. It may be expected that, when the angle between the direction of the optical film in which the sound propagation velocity is the maximum (stretch direction of the film) and the direction of the absorption axis of the polarizing film (stretch direction of the film) combined with the optical film is small and when the angle between the dimensional change direction of the optical film and the dimensional change direction of the polarizing film is small, then the optical distortion caused by internal stress could be reduced, and the case is preferred from the viewpoint that, when the optical film is mounted on a liquid-crystal display device, the liquid-crystal display device can be prevented from being troubled by optical unevenness.

Of the optical film for use in the polarizer of the present invention, preferably, the absolute value of the photo-elastic coefficient C in the direction orthogonal to the in-plane direction in which the sound propagation velocity through the optical film is the maximum is $2\times10^{-12}$ $Pa^{-1}$ or more, more preferably from $2\times10^{-12}$ $Pa^{-1}$ to $100\times10^{-12}$ $Pa^{-1}$ even more preferably from $4\times10^{-12}$ $Pa^{-1}$ to $15\times10^{-12}$ $Pa^{-1}$, still more preferably from $5\times10^{-12}$ $Pa^{-1}$ to $12\times10^{-12}$ $Pa^{-1}$. The preferred range of the absolute value of the photo-elastic coefficient C of the optical film in the film widthwise direction is the same as the preferred range of the absolute value of the photo-elastic coefficient C of the optical film in the direction orthogonal to the direction of the optical film in which the sound propagation velocity is the maximum.

Of the optical film for use in the polarizer of the present invention, preferably, the absolute value of the photo-elastic coefficient C in the direction of the optical film in which the sound propagation velocity is the maximum and in the direction orthogonal to the direction of the optical film in which the sound propagation velocity is the maximum is $2\times10^{-12}$ $Pa^{-1}$ or more, more preferably from $2\times10^{-12}$ $Pa^{-1}$ to $100\times10^{-12}$ $Pa^{-1}$ even more preferably from $4\times10^{-12}$ $Pa^{-1}$ to $15\times10^{-12}$ $Pa^{-1}$ still more preferably from $5\times10^{-12}$ $Pa^{-1}$ to $12\times10^{-12}$ $Pa^{-1}$. In other words, the absolute value of the photo-elastic coefficient C of the optical film in both the film lengthwise direction and the film widthwise direction is preferably $2\times10^{-12}$ $Pa^{-1}$ or more, more preferably from $2\times10^{-12}$ $Pa^{-1}$ to $100\times10^{-12}$ $Pa^{-1}$, even more preferably from $4\times10^{-12}$ $Pa^{-1}$ to $15\times10^{-12}$ $Pa^{-1}$, still more preferably from $5\times10^{-12}$ $Pa^{-1}$ to $12\times10^{-12}$ $Pa^{-1}$. It is presumed that ΔRth (pol) of the optical film in polarizers would be related to the stress given in the thickness direction of the optical film and the photo-elastic coefficient of the film; however, it is difficult to measure the photo-elastic coefficient of the film in the thickness direction, and therefore, the magnitude relationship of the photo-elastic coefficient in the thickness direction is estimated from the photo-elastic coefficient in the in-plane direction. For the estimation, the photo-elastic coefficient in two in-plane directions orthogonal to each other (for example, two directions of the direction of the optical film in which the sound propagation velocity is the maximum and the direction orthogonal to the direction of the optical film in which the sound propagation velocity is the maximum) is used, rather than using the photo-elastic coefficient in only one in-plane direction (for example, only the direction of the optical film in which the sound propagation velocity is the maximum), and further, the data are averaged to give an average value, whereby the prediction accuracy for ΔRth (pol) of the optical film in polarizer can be increased.

In this description, the photo-elastic coefficient of film can be measured in any in-plane direction of film. Unless otherwise specifically indicated, the photo-elastic coefficient of film is measured here as follows: A film is cut into a sample having a size of 1 cm×5 cm in such a manner that the direction for the measurement could be the film lengthwise direction, then the sample is conditioned at 25° C. and at a relative humidity of 60% for 2 hours, and using a spectral ellipsometer (M-220 by JASCO) under the same environment, the in-plane retardation (Re) of the film sample at a wavelength of 590 nm is measured while the sample is given a stress (0 to 500 gf), and the photo-elastic coefficient of the film is calculated from the inclination of Re relative to the given stress.

The photo-elastic coefficient in any other direction may also be measured in the same manner. For example, the photo-elastic coefficient in the film widthwise direction may be measured as follows: A film is cut into a sample having a size of 1 cm×5 cm in such a manner that the film measurement direction could be the film widthwise direction, then the sample is conditioned at 25° C. and at a relative humidity of 60% for 2 hours, and using a spectral ellipsometer (M-220 by JASCO) under the same environment, the in-plane retardation (Re) of the film sample at a wavelength of 590 nm is measured while the sample is given a stress (0 to 500 gf), and the photo-elastic coefficient of the film is calculated from the inclination of Re relative to the given stress.

<Sound Propagation Velocity>

The optical film for use in the polarizer of the invention has an in-plane direction in which the sound propagation velocity through the optical film is the maximum.

Preferably, the angle between the direction of the optical film in which the sound propagation velocity is the maximum and the MD direction of the optical film in film production is from 0° to less than 45° from the viewpoint that, when the optical film is stuck to a polarizing film in a roll-to-roll system, the angle between the direction of the absorption axis of the polarizing film and the direction of the optical film in which the sound propagation velocity is the maximum could be from 0° to less than 45°. More preferably, the angle is from 0° to less than 30°, even more preferably from 0° to less than 10°. The preferred range of the angle between the direction of the optical film in which the sound propagation velocity is the maximum and the MD direction of the optical film in film production is the same as the preferred range of the angle between the direction of the absorption axis of the polarizing film and the direction of the optical film in which the sound propagation velocity is the maximum.

In addition, the preferred range of the angle between the MD direction of the optical film in film production and the film lengthwise direction is also the same as the preferred range of the angle between the direction of the absorption axis of the polarizing film and the direction of the optical film in which the sound propagation velocity is the maximum.

In this description, the sound propagation velocity of the optical film is measured as follows: A film is conditioned at 25° C. and at a relative humidity of 60% for 24 hours, and using an orientation tester (SST-2500, by Nomura Shoji) in the same environment, the conditioned film is tested to measure the propagation speed of the longitudinal wave vibration of an ultrasonic pulse through the film. This is referred to as the sound propagation velocity through the film. From the sound propagation velocity profile, the direction of the optical film in which the sound propagation velocity is the maximum is determined.

Preferably, the ratio of the sound propagation velocity in the direction of the optical film in which the sound propagation velocity is the maximum and that in the direction orthogonal to that direction (the in-plane direction of the optical film in which the sound propagation velocity is the maximum), or that is, the ratio of sound propagation velocity in the maximum direction/sound propagation velocity in the orthogonal direction (maximum direction/orthogonal direction) is 1.1 or more, more preferably 1.2 or more, even more preferably 1.24 or more. The upper limit is not specifically defined, but is preferably 5.0 or less, more preferably 2.0 or less. Making the ratio of the sound propagation velocity (maximum direction/orthogonal direction) be 1.1 or more is preferred from the viewpoint of lowering ΔRth(pol) of the optical film in polarizers.

The anisotropy of sound propagation velocity, or that is, mechanical anisotropy of the optical film may be controlled by the process condition and the stretch condition in film production. By stretching the film, the sound propagation direction in the stretch direction of the film can be increased.

<Retardation>

In this description, Re and Rth (unit: nm) of film are determined according to the method mentioned below.

First, a film is conditioned at 25° C. and at a relative humidity of 60%, and using a prism coupler (MODEL 2010 Prism Coupler, by Metricon) and using a solid laser at 532 nm still at 25° C. and at a relative humidity of 60%, the mean refractive index (n) of the film is calculated according to the following formula (A):

$$n = (n_{TE} \times 2 + n_{TM})/3 \qquad \text{Formula (A):}$$

[In the formula, $n_{TE}$ indicates the refractive index of the film measured with polarized light in the in-plane direction of the film; and $n_{TM}$ indicates the refractive index of the film measured with polarized light in the normal direction of the film.]

In this description, Re (λ nm) and Rth (λ nm) each mean the in-plane retardation and the thickness-direction retardation, respectively, of film at a wavelength of λ (unit: nm). Re (λ nm) is measured by applying a light having a wavelength of 2 nm to a film sample in the normal direction thereof, using KOBRA 21ADH or WR (by Oji Scientific Instruments).

Rth (λ nm) is calculated according to the method mentioned below.

With the in-plane slow axis (determined by KOBRA 21ADH or WR) taken as the tilt axis (rotation axis) of the film (in case where the film has no slow axis, the rotation axis of the film may be in any in-plane direction of the film), Re (λ nm) of the film is measured at 6 points in all thereof, from the normal direction of the film up to 50 degrees on one side relative to the normal direction thereof at intervals of 10 degrees, by applying a light having a wavelength of λ nm from the tilted direction of the film. Based on the thus-determined retardation data, the mean refractive index and the inputted film thickness, Rth (λ nm) of the film is calculated with KOBRA 21ADH or WR.

In the above, in a case where no specific description relating to λ is not given and only Re and Rth are described, the data indicate the values measured with a light having a wavelength of 590 nm. In a case of a film that has a direction in which the retardation thereof is zero at a certain tilt angle relative to the in-plane slow axis thereof in the normal direction taken as a rotation axis, the sign of the retardation value of the film at the tilt angle larger than that tilt angle is changed to negative prior to calculation with KOBRA 21ADH or WR.

Apart from this, the retardation may also be measured as follows: With the slow axis taken as the tilt axis (rotation axis) of the film (in case where the film has no slow axis, the rotation axis of the film may be in any in-plane direction of the film), the retardation is measured in any desired two directions, and based on the thus-determined retardation data, the mean refractive index and the inputted film thickness, Rth is calculated according to the following formulae (3) and (4).

Formula (3)

$$Re(\theta) = \left[ nx - \frac{(ny \times nz)}{\left( \sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2} \right)} \right] \times \frac{d}{\cos\left(\sin^{-1}\left(\frac{\sin(-\theta)}{nx}\right)\right)} \quad [\text{Math. 1}]$$

[In the formula, Re (θ) means the retardation of the film in the direction tilted by an angle θ from the normal direction to the film. nx means the in-plane refractive index of the film in the slow axis direction, ny means the in-plane refractive index of the film in the direction orthogonal to nx, nz means the refractive index in the thickness direction orthogonal to nx and ny, and d means the film thickness.]

$$Rth = ((nx+ny)/2 - nz) \times d \quad \text{Formula (4):}$$

The retardation of the optical film for use in the polarizer of the present invention is not specifically defined. In case where the polarizer is used in IPS-mode liquid-crystal display devices, Re of the optical film therein is preferably from 0 to 20 nm, more preferably from 0 to 10 nm, even more preferably from 0 to 5 nm. Rth of the optical film for use in the polarizer of the invention is preferably from −25 to 25 nm, more preferably from −20 to 5 nm, even more preferably from −10 to 0 nm. When Re and Rth of the optical film for use in the polarizer of the invention each fall within the above range, then the light leakage in oblique direction of display devices comprising the polarizer can be prevented more and the display quality thereof can be thereby improved.

In case where the polarizer of the invention is used in VA-mode liquid-crystal display devices, Re of the optical film therein is preferably from 30 to 85 nm, more preferably from 40 to 80 nm, even more preferably from 45 to 75 nm. In case where the polarizer of the invention is used in VA-mode liquid-crystal display devices, Rth of the optical film therein is preferably from 80 to 300 nm, more preferably from 90 to 280 nm, even more preferably from 100 to 250 nm.

In another embodiment where the polarizer of the invention is used in IPS-mode liquid-crystal display devices, Re of the optical film therein is preferably from 60 to 400 nm, more preferably from 80 to 350 nm, even more preferably from 100 to 300 nm. In this case, Rth/Re of the optical film in the polarizer is preferably from −0.5 to 0.5, more preferably from −0.4 to 0.4, even more preferably from −0.3 to 0.3.

<Humidity Dependence of Retardation>

The humidity dependence of Re (ΔRe) of the optical film for use in the polarizer of the present invention is not specifically defined, but is preferably from −20 to 20 nm, more preferably from −10 to 10 nm, even more preferably from −5 to 5 nm.

The humidity dependence of Rth (ΔRth) of the optical film for use in the polarizer of the present invention is preferably 20 nm or less as the absolute value thereof (that is, from −20 to 20 nm), more preferably from −15 to 15 nm, even more preferably from −10 to 10 nm, most preferably from −5 to 5 nm.

Preferably, the photo-elastic coefficient (C) of the optical film and ΔRth of the optical film as device members satisfy the relationship of the formula (1), since ΔRth(pol) of the optical film in polarizers is easy to control.

$$C \times \Delta Rth > 0 \quad \text{Formula (1)}$$

In the formula, C indicates the photo-elastic coefficient of the optical film, and the photo-elastic coefficient C of the optical film is a value measured in an environment at 25° C. and a relative humidity of 60%, at a wavelength of 590 nm, and ΔRth indicates the humidity dependence of the thickness-direction retardation, Rth, of the optical film.

In this description, ΔRe and ΔRth each are the in-plane direction retardation and the thickness-direction retardation at a relative humidity H (unit: %), Re (H %) and Rth (H %), respectively, and are therefore calculated according to the following formulae.

$$\Delta Re = Re(30\%) - Re(80\%)$$

$$\Delta Rth = Rth(30\%) \times Rth(80\%)$$

In the formulae, Re (H %) and Rth (H %) are determined as follows: A film is conditioned at 25° C. and at a relative humidity (H %) for 24 hours, and then, according to the above-mentioned retardation measurement method, the retardation of the film at the relative humidity H % is measured and calculated. Mere expression of Re with no specific indication of the relative humidity is a value measured at a relative humidity of 60%. Unless otherwise specifically indicated, the value is at a wavelength of 590 nm.

<Thickness>

The thickness of the optical film for use in the polarizer of the invention is not specifically defined, but is preferably from 10 to 50 nm, more preferably from 15 to 45 nm, even more preferably from 20 to 40 μm. Falling within the range, the film secures production aptitude thereof and working aptitude for polarizers. The range is also favorable as capable of expecting the effect of reducing optical unevenness in the liquid-crystal display device where the optical film is mounted, with environmental changes and capable of expecting the effect of reducing the liquid-crystal panel from deforming with temperature/humidity changes.

<Modulus of Elasticity>

The modulus of elasticity of the optical film for use in the polarizer of the present invention is not specifically defined, but is preferably from 1 to 10 GPa in the machine direction (MD), more preferably from 2 to 7 GPa, even more preferably from 3 to 5 GPa. The modulus of elasticity of the optical film for use in the polarizer of the invention is preferably from 0.5 to 8 GPa in the transverse direction (TD), more preferably from 1 to 5 GPa, even more preferably from 1.5 to 3 GPa. From the viewpoint of reducing ΔRth (pol), the modulus of elasticity in the MD direction is preferably 10 GPa or less, and the modulus of elasticity in the TD direction is preferably 8 GPa or less. From the viewpoint of the film production aptitude and the polarizer working aptitude (handleability and polarizer curling resistance), the modulus of elasticity in the MD direction is preferably 1 GPa or more and the modulus of elasticity in the TD direction is preferably 0.5 GPa or more.

The preferred range of the modulus of elasticity in the direction of the optical film in which the sound propagation velocity is the maximum is the same as the preferred range of the modulus of elasticity in the MD direction of the optical film. The preferred range of the modulus of elasticity in the film lengthwise direction of the optical film is the same as the preferred range of the modulus of elasticity in the MD direction of the optical film.

The preferred range of the modulus of elasticity in the direction orthogonal to the direction of the optical film in which the sound propagation velocity is the maximum is the same as the preferred range of the modulus of elasticity in the TD direction of the optical film. The preferred range of the modulus of elasticity in the film widthwise direction of the optical film is the same as the preferred range of the modulus of elasticity in the TD direction of the optical film.

The modulus of elasticity (modulus of tensile elasticity) may be measured in any direction. For example, the modulus of elasticity in the film lengthwise direction may be measured as follows: A film is cut into a sample having a size of 10 cm×1 cm in such a manner that the measurement direction could be the film lengthwise direction, and then conditioned at 25° C. and at a relative humidity of 60% for 24 hours. Using Toyo Boldwin's universal tensile tester "STM T50BP", the stress given to the sample at a pulling rate of 10%/min for an elongation of 0.1% and an elongation of 0.5% is measured. From the degree of inclination of the data, the modulus of elasticity is calculated.

The modulus of elasticity in the film widthwise direction may be measured as follows: A film is cut into a sample having a size of 10 cm×1 cm in such a manner that the measurement direction could be the film widthwise direction, and then conditioned at 25° C. and at a relative humidity of 60% for 24 hours. Using Toyo Boldwin's universal tensile tester "STM T50BP", the stress given to the sample at a pulling rate of 10%/min for an elongation of 0.1% and an elongation of 0.5% is measured. From the degree of inclination of the data, the modulus of elasticity is calculated.

<Humidity Expansion Coefficient>

The humidity expansion coefficient of the optical film for use in the polarizer of the present invention is not specifically defined, but is preferably 55 ppm/% RH or less in the MD direction, more preferably from 3 to 50 ppm/% RH, even more preferably from 5 to 45 ppm/% RH. The humidity expansion coefficient of the optical film for use in the polarizer of the invention is preferably 10 ppm/% RH or more in the TD direction, more preferably from 30 to 300 ppm/% RH, even more preferably from 50 to 250 ppm/% RH. From the viewpoint of reducing ΔRth (pol) it is considered that the humidity expansion coefficient of the optical film is preferably close to that of the polarizer comprising the film, and therefore, the above-mentioned preferred range can be suitably modified in accordance with the characteristics of the polarizer.

The humidity expansion coefficient may be measured as follows: A film is cut into a sample having a size of 12 cm×5 cm in such a manner that the measurement direction could be the film lengthwise direction or the film widthwise direction, then pin holes are formed in the sample at intervals of 10 cm using a punch, the sample is thereafter conditioned at 25° C. and at a relative humidity of 10% for 24 hours, and thereafter the distance between the neighboring pin holes is measured with a tester equipped with a pair of pins (the measured value is referred to as $L_0$). Next, the sample is conditioned at 25° C. and at a relative humidity of 80% for 24 hours, and the distance is measured similarly to the above (measured value is referred to as $L_1$). Using the measured values, the humidity expansion coefficient is calculated according to the following formula.

Humidity Expansion Coefficient [ppm/% RH]= $\{(L_1-L_0)/L_0\}/70\times10^6$

In the formula, 70 is the humidity difference (%) in the measurement.

<Other Characteristics>

The other characteristic values than the above of the optical film for use in the polarizer of the present invention are not specifically defined. The optical film may suitably have the same performance level as that of ordinary known polarizer protective film. Preferably, the optical film suitably has the performance that is required for so-called inner films to be arranged between polarizer and liquid-crystal panel. Concrete characteristic values include haze, light transmittance, spectral characteristics, wet heat durability of retardation and the like relating to display characteristics, as well as dimensional change accompanied by wet heat thermal treatment, glass transition temperature, equilibrium moisture absorptivity, moisture permeability and contact angle relating to mechanical characteristics and polarizer working aptitude.

<Layer Configuration>

The optical film for use in the polarizer of the invention may further have a functional layer.

However, it is desirable that the other layer than the functional layer in the optical film for use in the polarizer of the invention satisfies the above-mentioned characteristics.

The other layer than the functional layer may be a single-layer film or may have a laminate structure of two or more layers. For example, the other layer than the functional layer preferably has a laminate structure of two layers of a core layers and an outer layer (this may be referred to as a surface layer or a skin layer), or a laminate structure of three layers of an outer layer, a core layer and an outer layer. Also preferred is an embodiment where the laminate structure is formed through co-casting. The other layer than the functional layer is preferably a single-layer film.

Preferably, in the optical film for use in the polarizer of the present invention, the other layer than the functional layer is directly laminated on the polarizing film of the polarizer, as kept in direct contact with the polarizing film. More preferably, the optical film for use in the polarizer of the invention does not have a functional layer, and the optical film is directly laminated on the polarizing film of the polarizer, as kept in direct contact with the polarizing film.

(Characteristics of Polarizer)

<Humidity Dependence or Retardation>

In the polarizer of the invention, the temperature dependence of Rth of the optical film therein (ΔRth(pol)) is determined, by separately measuring the retardation of each constituent layer using AxoScan (by Axometrics).

For use in the polarizer of the present invention, the temperature dependence of Rth of the optical film in polarizers (ΔRth(pol)) is preferably from −20 to 20 nm, more preferably from −15 to 15 nm, even more preferably from −10 to 10 nm, most preferably from −5 to 5 nm.

In this description, ΔRth (pol) may be calculated from the in-plane and thickness-direction retardation values at a relative humidity of H (unit: %), Re (H %) and Rth (H %), according to the following formula:

$$\Delta Rth(\text{pol})=Rth(\text{pol},30\%)-Rth(\text{pol},80\%)$$

Rth (pol, H %) may be measured as follows: A polarizer is conditioned at 25° C. and at each relative humidity H % for 72 hours, and then the retardation value thereof at the relative humidity H % is measured. Mere expression of Re (pol) with no definite indication of the relative humidity indicates the value of the sample, which is measured after the sample is left at a relative humidity of 60% for 72 hours and then the sample is analyzed under the same environment. Unless otherwise specifically indicated, the value is at a wavelength of 590 nm.

(Formation of Optical Film)
<Polymer Resin>

The polymer resin that constitutes the optical film for use in the polarizer of the present invention is not specifically defined so far as the photo-elastic coefficient thereof could fall within the preferred range; however, from the viewpoint of improving the resistance to brittleness and improving the elasticity, the resin preferably contains a structure, for example a polar structure capable of strengthening the interaction between the polymer molecules. Specific examples of the resin includes cellulose resin (cellulose acylate resin, cellulose ether resin, etc.), cyclicpolyolefin resin, polyester resin, polycarbonate resin, vinyl resin, polyimide resin, polyarylate resin, etc. Preferred are cellulose acylate resin and cyclic polyolefin resin from the viewpoint of improving the resistance to brittleness.

Examples of the cellulose acylate resin include cellulose acetate, cellulose acetate propionate, cellulose propionate, cellulose acetate butyrate, cellulose acetate propionate butyrate, cellulose acetate benzoate, etc. Of those, preferred are cellulose acetate and cellulose acetate propionate. The total acyl substitution degree of the cellulose acylate resin is not specifically defined. For example, employable here is a cellulose acylate resin having the degree of from 1.50 to 3.00. Preferred is a cellulose acylate resin having the degree of from 2.50 to 3.00. In case where cellulose acetate is used as the cellulose acylate resin, the acetyl substitution degree thereof is preferably from 2.00 to 3.00, more preferably from 2.50 to 3.00, even more preferably from 2.70 to 2.95. In case where cellulose acetate propionate is used as the cellulose acylate resin, preferably, the acetyl substitution degree thereof is from 0.30 to 2.80 and the propionyl substitution degree is from 0.20 to 2.70; more preferably, the acetyl substitution degree is from 1.00 to 2.60 and the propionyl substitution degree is from 0.40 to 2.20; and even more preferably, the acetyl substitution degree is from 1.30 to 2.40 and the propionyl substitution degree is from 0.60 to 1.50.

Examples of the cyclic polyolefin resin include cyclic polyolefin resins and the like contained Arton (by JSR) or Zeonoa Film (by Zeon).

Examples of the polycarbonate resin include polycarbonate, polycarbonate containing a structure unit in which bisphenol A is fluorene-modified, polycarbonate containing a structure unit in which bisphenol A is 1,3-cyclohexylidene-modified, etc.

Examples of the vinyl resin include polyethylene, polypropylene, polystyrene, polyvinylidene chloride, polyvinyl alcohol, etc.

One alone or two or more different types of polymer resins may constitute the optical film for use in the polarizer of the present invention. In case where the optical film is formed of multiple layers, the polymer resin of each layer may differ from each other.

The polymer resin to constitute the optical film for use in the polarizer of the invention means the polymer component that accounts for 50% by mass or more of all the polymer components constituting the optical film. Of the polymer components constituting the optical film for use in the polarizer of the invention, it is desirable that the above-mentioned polymer resin accounts for 60% by mass or more, more preferably 70% by mass or more.

<Additives>

Any known additives may be suitably mixed in the optical film for use in the polarizer of the invention. The known additives include a low-molecular plasticizer (phosphate, carboxylate), an polyester compound oligomer, a sugar ester compound, a retardation regulator (enhancer, reducer, wavelength dispersion regulator, temperature-dependence reducer, durability improver), a mat agent, a UV absorbent, a degradation inhibitor, a peel promoter, an IR absorbent, etc. The type and the amount of each material is not specifically defined, so far as the photo-elastic coefficient could fall within the preferred range. In case where the optical film has a multilayer structure, the type and the amount of the additive in each layer may differ.

The polyester compound oligomer may be one described in JP-A 2009-98674, paragraphs [0027] to [0034]. The amount of the polyester compound oligomer is preferably from 3 to 100% by mass relative to the resin that constitutes the optical film, more preferably from 10 to 50% by mass, even more preferably from 15 to 30% by mass.

For increasing the modulus of elasticity in the MD direction and the TD direction of the optical film for use in the polarizer of the invention, preferably used is a sugar ester compound. The sugar ester compound includes those described in JP-A 2012-215812, paragraphs [0022] to [0050]. The content of the sugar ester compound is preferably from 3 to 50% by mass relative to the resin that constitutes the optical film, more preferably from 4 to 30% by mass, even more preferably from 5 to 20% by mass.

As the retardation regulator, usable here are the compounds described in JP-A 2001-166144, paragraphs [0016] to [0107], and JP-A 2002-296421, paragraphs [0007] to [0043]. The content of the retardation regulator is preferably from 0 to 10% by mass relative to the resin that constitutes the optical film, more preferably from 0.01 to 5% by mass, even more preferably from 0.1 to 1% by mass.

<Mat Agent>

Preferably, fine particles are added to the surface of the optical film for imparting to the film lubricity between films and for securing resistance to blocking. As fine particles, preferably used here is silica (silicon dioxide, $SiO_2$) of which the surface is coated with a hydrophobic group and which has a morphology of secondary particles. Along with silica or in place of silica, also usable here are other fine particles of titanium dioxide, aluminium oxide, zirconium oxide, calcium carbonate, talc, clay, fired kaolin, fired calcium silicate, hydrated calcium silicate, aluminium silicate, magnesium silicate, calcium phosphate, etc. As commercial products of such fine particles, there are mentioned trade names of R972 and NX90S (both by Nippon Aerosil), etc.

The fine particles function as a so-called mat agent. Addition of such fine particles forms fine irregularities on the film surface, and owing to those irregularities, the films do not stick to each other when stacked, and the lubricity between films can be thereby secured. In the case, when the number per $mm^2$ of the fine irregularities formed by those fine particles protruding from the film surface and having a height of 30 nm is $10^4/mm^2$, then the effect of improving the lubricity and blocking resistance is great.

In case where the optical film is used as a protective film of a polarizer, the film is saponified. As a result saponification, the height of the protrusions from the film surface may reduce and the density thereof may also reduce, and owing to hydrophilization, the film absorbs moisture and may swell with ease, and as a result, the film blocking tends to occur. Consequently, when the number per $mm^2$ of the fine irregularities of the fine particles protruding from the film surface to a height of 30 nm or more is still $10^4/mm^2$ even after saponification treatment, the effect of improving the lubricity of the film after saponification and the effect of improving the blocking resistance thereof is great.

Preferably, the mat agent particles are given to the surface layer of the film, for improving the blocking resistance and the lubricity of the film without increasing the haze thereof. As a method of giving fine particles to the surface layer, there is mentioned a technique of multilayer casting or coating.

<Film Formation, Stretching>

The optical film for use in the polarizer of the present invention can be produced according to a known solution casting method or a melt extrusion method.

For forming the film according to a solution casting method, usable here is a method preferably used in formation of a cellulose acylate film. A polymer resin is dissolved in an organic solvent or water to prepare a solution (dope), this is optionally processed in a concentration step and a filtration step, and then uniformly cast onto a support. Next, the semi-dried dope film (also called a web) is peeled from the support, and dried in a drying zone to remove the solvent while both sides of the web are optionally clipped. In this step, preferably, the web is stretched to thereby impart mechanical anisotropy to the optical film in the desired direction thereof. The film may be separately stretched after dried, and during the stretching step, the sound propagation velocity ratio can be controlled.

In the melt extrusion method, a polymer resin is melted under heat, then optionally processed in a filtration step, and thereafter uniformly cast onto a support. Next, the cooled and solidified film is peeled and may be optionally stretched.

If desired, the formed film may be processed in a heat treatment step, a superheated steam contact step, an organic solvent contact step, etc. Also if desired, the film may be processed for surface treatment so as to be used as a hard coat film, an antiglare film, or an antireflection film.

(Production of Polarizer)

The optical film produced in the above may be used as a protective film for polarizer. The polarizer of the present invention may be produced in any known method. For producing the polarizer, the optical film may be stuck to a polarizing film in such a manner that the angle between the direction of the absorption axis of the polarizing film and the direction of the optical film in which the sound propagation velocity is the maximum could fall within the above-mentioned range.

Preferably, the optical film is hydrophilized through the above-mentioned surface treatment (as described in JP-A 6-94915, 6-118232), and for example, the optical film is preferably processed for glow discharge treatment, corona discharge treatment, or alkali saponification treatment. As the surface treatment, most preferred is alkali saponification treatment.

<Polarizing Film>

As the polarizing film, for example, usable here is one produced by immersing a polyvinyl alcohol film in an iodine solution followed by stretching it. When the polarizing film of the type is used, the surface-treated surface of the optical film for use in the polarizer of the invention may be directly stuck to one or both surfaces of the polarizing film using an adhesive comprising an aqueous solution of a polyvinyl alcohol resin. As the adhesive, usable here is an aqueous solution of polyvinyl alcohol or polyvinyl acetal (for example, polyvinyl butyral), or a latex of a vinylic polymer (for example, polybutyl acrylate), or a UV adhesive. Most preferred is an aqueous solution of a completely saponified polyvinyl alcohol.

In the polarizer of the present invention, the angle between the direction of the optical film in which the sound propagation velocity is the maximum and the direction of the absorption axis of the polarizing film falls within a range of from 0° to less than 45°. To satisfy the relationship, the optical film is stuck to the polarizing film in production of the polarizer of the present invention in such a manner that the angle between the direction of the optical film in which the sound propagation velocity is the maximum and the direction of the absorption axis of the polarizing film could be from 0° to less than 45°. The angle between the direction of the optical film in which the sound propagation velocity is the maximum and the direction of the absorption axis of the polarizing film is more preferably within a range of from 0 to 30°, even more preferably from 0 to 15°, still more preferably from 0 to 10°, most preferably from 0 to 5°. When the angle between the direction of the optical film in which the sound propagation velocity is the maximum and the direction of the absorption axis of the polarizing film is controlled to fall within a range of from 0° to less than 45°, then the retardation change ($\Delta Rth$ (pol)) to occur in the optical film that constitutes the polarizer, as caused by the internal stress of the film, could be retarded.

A different optical film of the invention may be further stuck to the opposite surface of the polarizing film to which the optical film has been stuck, or any other known optical film may be stuck thereto.

The other known optical film is not specifically defined in any of the optical characteristics and the materials thereof; however, preferred are optical films containing (or comprising as the main ingredient thereof) a cellulose ester resin, an acrylic resin and/or a cyclic olefin resin. The known optical film may be an optically isotropic film or an optically anisotropic retardation film.

As the known optical film containing a cellulose ester resin, for example, usable is Fujitac TD40UC (by FUJIFILM) or the like.

As the known optical film containing an acrylic resin, usable are optical films containing a (meth)acrylic resin that contains a styrenic resin as described in Japanese Patent 4570042, optical films containing a (meth)acrylic resin that has a glutarimide ring structure in the main chain thereof as described in Japanese Patent 5041532, optical films containing a (meth)acrylic resin that has a lactone ring structure as described in JP-A 2009-122664, and optical films containing a (meth)acrylic resin that has a glutaric acid anhydride unit as described in JP-A 2009-139754.

As the known optical film containing a cyclic olefin resin, usable are cyclic olefin resin films described in JP-A 2009-237376, paragraph [0029] and later, and cyclic olefin resin films containing an additive capable of reducing Rth as described in Japanese Patent 4881827 and JP-A 2008-063536.

[Liquid-Crystal Display Device]

The liquid-crystal display device of the present invention contains a liquid-crystal cell and the polarizer of the invention.

In the liquid-crystal display device of the present invention, the optical film of the invention may be arranged favorably on any side of the inner side (or that is, between the polarizing film and the liquid-crystal cell) or the outer side (or that is, on the side opposite to the side of the liquid-crystal cell). Preferably, in the liquid-crystal display device of the present invention, the optical film of the invention is arranged between the polarizing film and the liquid-crystal cell.

Preferably, the liquid-crystal display device of the invention has a backlight, and the polarizer is arranged on the backlight side or on the viewing side. The backlight is not specifically defined, and any known backlight is usable here. Preferably, the liquid-crystal display device of the invention is so configured that the backlight, the polarizer on the backlight side, the liquid-crystal cell, and the polarizer on the viewing side are laminated in that order.

As the other configuration, any configuration of known liquid-crystal display devices is employable here. The liquid-crystal cell mode is not also specifically defined. Various types of liquid-crystal cell modes are employable here, including a TN (twisted nematic) mode liquid-crystal cell, an IPS (in-plane switching) mode liquid-crystal cell, an FLC (ferroelectric liquid-crystal) mode liquid-crystal cell, an AFLC (anti-ferroelectric liquid-crystal) mode liquid-crystal cell, an OCB (optically compensatory bend) mode liquid-crystal cell, an STN (super twisted nematic) mode liquid-crystal cell, a VA (vertically aligned) mode liquid-crystal cell, a HAN (hybrid aligned nematic) mode liquid crystal cell, etc. Above all, in the liquid-crystal display device of the present invention, the liquid-crystal cell is preferably a VA-mode or IPS-mode liquid-crystal cell.

As the other configuration, any configuration in known liquid-crystal display devices is employable in the liquid-crystal display device of the present invention.

EXAMPLES

The invention is described in more detail with reference to the following Examples, in which the material used, its amount and ratio, the details of the treatment and the treatment process may be suitably modified or changed not overstepping the spirit and the scope of the invention. Accordingly, the invention should not be limitatively interpreted by the Examples mentioned below.

<<1>> Production and Evaluation of Optical Film

The following materials were used.
1] Resin
Resin 1:
  A powder of cellulose acetate having a degree of substitution of 2.86 was dried at 120° C. so as to have a moisture absorptivity of 0.5% by mass or less, and this was used here. The viscosity-average polymerization degree of the resin 1 was 300, the 6-position acetyl group substitution degree was 0.89, the acetone extract fraction was 7% by mass, the ratio of mass-average molecular weight/number-average molecular weight was 2.3, the water content was 0.2% by mass, the viscosity in a 6 mass % dichloromethane solution was 305 mPa·s, the remaining acetic acid amount was 0.1% by mass, the Ca content was 65 ppm, the Mg content was 26 ppm, the iron content was 0.8 ppm, the sulfate ion content was 18 ppm, the yellow index was 1.9, the free acetic acid amount was 47 ppm. The mean particle size of the powder was 1.5 μm, and the standard deviation was 0.5 μm.
Resin 2:
  Pellets of Arton (by JSR, Tg 120° C.) were dried in a vacuum drier at 110° C. so as to have a moisture absorptivity of 0.1% by mass or less, and used here.
Resin 3:
  A powder of cellulose acetate having a substitution degree of 2.87 was dried at 120° C. so as to have a moisture absorptivity of 0.5% by mass or less, and used here. The viscosity-average polymerization degree of the resin 3 was 300, and the 6-position acetyl group substitution degree was 0.90.
Resin 4:
  A powder of cellulose acetate propionate having an acetyl substitution degree of 1.17 and a propionyl substitution degree of 0.70 was dried at 120° C. so as to have a moisture absorptivity of 0.5% by mass or less, and used here. The viscosity-average polymerization degree of the resin 4 was 280.
2] Additive
Oligomer 1:
  Condensate of ethanediol/adipic acid (1/1 by mol), having a number-average molecular weight of 1000 and a hydroxyl value of 112 mg KOH/g.

Oligomer 2:
  Condensate of ethanediol/1,2-propanediol/adipic acid (3/1/4 by mol) terminated with acetate on both ends, and having a number-average molecular weight of 1000 and a hydroxyl value of 0 mg KOH/g.
Sugar Ester 1:
  Monopet SOA (by Daiichi Kogyo Seiyaku)
Retardation Enhancer 1:
  Compound having the following structure:

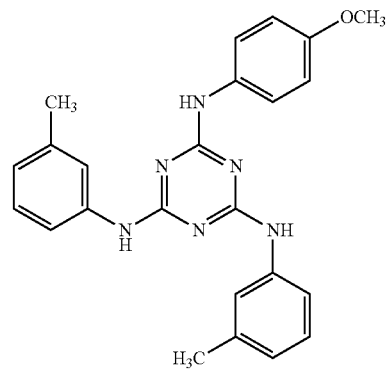 [SMILES: COc1ccc(Nc2nc(Nc3cccc(C)c3)nc(Nc3cccc(C)c3)n2)cc1]

(Other Additive)
Mat Agent 1:
  Silicon dioxide fine particles, NX90S (by Nippon Aerosil; particle size, 20 nm; Mohs hardness, about 7).
Mat Agent 2:
  Silicon dioxide fine particles, R972 (by Nippon Aerosil; particle size, 16 nm; Mohs hardness, about 7).
Stabilizer 1:
  Sumilizer GP (by Sumitomo Chemical)
<Optical Film 1>
(Preparation of Dope Solution)
  The following materials were swollen and dissolved in a mixed solvent of dichloromethane/methanol/butane=81/18/1 (by mass) each having a moisture absorptivity of 0.2% by mass or less, according to the process of the following dissolution step 1 to prepare a dope solution having a solid concentration of 24% by mass.

| Resin 1 | 20 parts by mass |
| Oligomer 1 | 25% by mass (relative to resin 1) |
| Retardation enhancer 1 | 0.5% by mass (relative to resin 1) |
| Mat agent 1 | 0.02% by mass (relative to resin 1) |

Dissolution Step 1
  The solvents and the additives were put into a 400-ml stainless solution tank having a stirring blade and having a system of cooling water running around the outer periphery thereof, and while these were stirred and dispersed in the tank, the resin 1 was gradually added thereto. After the addition, this was stirred for 2 hours at room temperature, swollen for 3 hours and then again stirred to prepare a swollen liquid.
  For the stirring, used were a dissolver-type eccentric stirring shaft that runs at a peripheral speed of 15 m/sec (shear stress $5 \times 10^4$ kgf/m/sec$^2$ [$4.9 \times 10^5$ N/m/sec$^2$]) and a stirring shaft that has an anchor blade at the center shaft and runs at a peripheral speed of 1 m/sec (shear stress $1 \times 10^4$ kgf/m/sec$^2$ [$9.8 \times 10^4$ N/m/sec$^2$]). For the swelling, the high-speed stirring shaft was stopped and the peripheral speed of the anchor blade-having stirring shaft was lowered to 0.5 m/sec.

From the tank, the swollen liquid was heated up to 50° C. in a jacketed pipe, and further heated up to 90° C. by pressurization at 2 MPa until complete dissolution. The heating time was 15 minutes. In this stage, the filter, the housing and the pipe line that are exposed to high temperatures are made of hastelloy alloy excellent in corrosion resistance and equipped with an insulating and heating jacket for heat carrier circulation therethrough. Next, the temperature was lowered to 36° C.

Subsequently, the obtained solution was filtered through a paper filter having an absolute filtration accuracy of 10 μm (#63, by Toyo Roshi), and through a sintered metal filter having an absolute filtration accuracy of 2.5 μm (FH025, by Poul) to give a dope solution.

(Production of Film)

The above dope solution was heated at 30° C., and cast onto a mirrored stainless support drum having a diameter of 3 m, through a casting Giesser. The temperature of the support was set at −7° C., the casting speed was 70 m/min, and the coating width was 200 cm. The spatial temperature in the whole of the casting zone was set at 15° C. With that, at the point of 50 cm before the end point of the casting zone, the film that had been cast and rotated was peeled from the drum, then taken out at a speed of 1.25 times the drum rotation speed so as to be stretched in the machine direction, and thereafter both sides of the film were clipped with a pin tenter. The residual solvent amount in the web just after peeled, which is defined by the following formula, was 280% by mass.

Residual Solvent Amount (% by mass)={(*M*−*N*)/*N*}× 100

[In the formula, M indicates the mass of the film just after peeled, N indicates the mass of the film after dried at 120° C. for 3 hours.]

Subsequently, the film held by the pin tenter was dried at 120° C. for 5 minutes, and then removed from the pin tenter. The film was trimmed off on both sides thereof, using an NT-type cutter applied to both the right and left sides of the film. Further, the film was dried while conveyed with rolls at 100° C. for 15 minutes, thereby giving an optical film 1 having a residual solvent amount of 0.3% by mass.

<Optical Film 2>

The following materials were used.

| Resin 2 | 20 parts by mass |
|---|---|
| Stabilizer 1 | 0.1% by mass (relative to resin 2) |
| Mat agent 1 | 0.02% by mass (relative to resin 2) |

(Production of Film)

Using a kneading extruder, a mixture of the resin 2, the stabilizer 1 and the mat agent 1 described above as materials was melted at 260° C., and extruded out via a gear pump. The resin melt was filtered through a leaf disc filter having a filtration accuracy of 5 μm. Subsequently, the resin melt was extruded out onto a casting roll (CR) set at a glass transition temperature Tg, through a hanger coat die at 260° C. and at a slit distance of 1.0 mm, and then brought into contact with a crown-shaped touch roll. The touch roll used here is one described in Example 1 in JP-A 11-235747 (double-press roll), and this was conditioned at Tg−5° C. (However, the thickness of the thin-film external cylinder was 3 mm.) After this, the film was led to run on a casting roll set at Tg+5° C. and a casting roll set at Tg−10° C.

Subsequently, the film was stretched in the machine direction in a stretching zone having a pair of nip rolls, then thermally relaxed at Tg+40° C., and thereafter trimmed on both sides (5% each of the total width) thereof to give an optical film 2. The retardation of the film was controlled by controlling the stretching temperature.

<Optical Film 3>

A commercial acrylic film (Technology S001G, by Sumitomo Chemical) is an optical film 3.

<Optical Film 4>

A commercial Zeonoa film (ZF14, by Zeon) is an optical film 4.

<Optical Film 5>

An optical film 5 was produced in the same manner as that for the optical film 1 except that the materials in preparing the dope solution for the optical film 1 were changed to the following:

| Resin 1 | 20 parts by mass |
|---|---|
| Oligomer 1 | 15% by mass (relative to resin 1) |
| Mat agent 2 | 0.02% by mass (relative to resin 1) |

<Optical Film 6>

(Preparation of Dope Solution)

The following materials were swollen and dissolved in a mixed solvent of dichloromethane/methanol=87/13 (by mass) each having a moisture absorptivity of 0.2% by mass or less, according to the process of the following dissolution step 2 to prepare a dope solution having a solid concentration of 22% by mass.

| Resin 3 | 20 parts by mass |
|---|---|
| Sugar ester 1 | 15% by mass (relative to resin 3) |
| Mat agent 2 | 0.02% by mass (relative to resin 3) |

Dissolution Step 2

The solvents and the additives were put into a 400-l stainless solution tank having a stirring blade and having a system of cooling water running around the outer periphery thereof, and while these were stirred and dispersed in the tank, the resin 3 was gradually added thereto. After the addition, this was stirred for 2 hours at room temperature, swollen for 3 hours and then again stirred to prepare a swollen liquid.

For the stirring, used were a dissolver-type eccentric stirring shaft that runs at a peripheral speed of 15 m/sec (shear stress $5\times10^4$ kgf/m/sec$^2$ [$4.9\times10^5$ N/m/sec$^2$]) and a stirring shaft that has an anchor blade at the center shaft and runs at a peripheral speed of 1 m/sec (shear stress $1\times10^4$ kgf/m/sec$^2$ [$9.8\times10^4$ N/m/sec$^2$]). For the swelling, the high-speed stirring shaft was stopped and the peripheral speed of the anchor blade-having stirring shaft was lowered to 0.5 m/sec.

From the tank, the swollen liquid was heated up to 50° C. in a jacketed pipe, and further heated up to 90° C. by pressurization at 2 MPa until complete dissolution. The heating time was 15 minutes. In this stage, the filter, the housing and the pipe line that are exposed to high temperatures are made of hastelloy alloy excellent in corrosion resistance and equipped with an insulating and heating jacket for heat carrier circulation therethrough. Next, the temperature was lowered to 36° C.

Subsequently, the obtained solution was filtered through a paper filter having an absolute filtration accuracy of 10 μm (#63, by Toyo Roshi), and through a sintered metal filter having an absolute filtration accuracy of 2.5 μm (FH025, by Poul) to give a dope solution.

(Production of Film)

The above dope solution was heated at 30° C., and cast onto a mirrored stainless support band (stainless belt) having a diameter of 80 m, through a casting Giesser. The temperature of the support was set at 15° C., the casting speed was 60 m/min, and the coating width was 250 cm. The spatial temperature in the whole of the casting zone was set at 15° C. With that, at the point of 50 cm before the end point of the casting zone, the film that had been cast and rotated was peeled from the band, then taken out at a speed of 1.25 times the band rotation speed so as to be stretched in the machine direction, and thereafter both sides of the film were clipped with a pin tenter. The residual solvent amount in the web just after peeled, which is defined by the following formula, was 40% by mass.

Residual Solvent Amount (% by mass)= $\{(M-N)/N\}\times 100$

[In the formula, M indicates the mass of the film just after peeled, N indicates the mass of the film after dried at 120° C. for 3 hours.]

Subsequently, the film held by the pin tenter was dried at 120° C. for 5 minutes, and then removed from the pin tenter. The film was trimmed off on both sides thereof, using a rotary blade applied to both the right and left sides of the film. Further, the film was dried while conveyed with rolls at 100° C. for 15 minutes, thereby giving an optical film 6 having a residual solvent amount of 0.3% by mass.

<Optical Film 7>

An optical film 7 was produced in the same manner as that for the optical film 6 except that the materials in preparing the dope solution for the optical film 6 were changed to the following:

| Resin 3 | 20 parts by mass |
| Oligomer 2 | 12% by mass (relative to resin 3) |
| Mat agent 2 | 0.02% by mass (relative to resin 3) |

<Optical Film 8>

An optical film 8 was produced in the same manner as that for the optical film 6 except that the materials in preparing the dope solution for the optical film 6 were changed to the following:

| Resin 4 | 20 parts by mass |
| Oligomer 2 | 12% by mass (relative to resin 4) |
| Mat agent 2 | 0.02% by mass (relative to resin 4) |

(Evaluation of Film}

The film produced in the above were evaluated according to the above-mentioned methods, and the results are shown in Table 1. Of the optical films 1 to 7, Re was from 0 to 5 nm and Rth was from −3 to 3 nm. Of the optical film 8, Re was from 0 to 4 nm and Rth was from −4 to 2 nm.

The angle between the direction of the optical films 1 to 8 in which the sound propagation velocity is the maximum and the film MD direction was determined, and shown in Table 1 below. Of the optical films 1 to 8, the ratio of the sound propagation velocity in the in-plane direction of the optical film in which the sound propagation velocity is the maximum and that in the direction orthogonal to the in-plane direction of the optical film in which the sound propagation velocity is the maximum (sound propagation velocity in the maximum direction/sound propagation velocity in the orthogonal direction) was from 1.24 to 2.0.

Of the optical films 1 to 8, the humidity expansion coefficient in the film MD direction was from 5 to 45 ppm/% RH, and was from 50 to 110 ppm/% RH in the film TD direction.

TABLE 1

| | Thickness [μm] | photo-elastic Coefficient C [×10$^{-12}$ Pa$^{-1}$] | | Angle between the in-plane direction in which the sound propagation velocity is the maximum and the film MD direction [°] | ΔRth[nm] | Modulus of Elasticity [GPa] | |
|---|---|---|---|---|---|---|---|
| | | MD | TD | | | MD | TD |
| Optical Film 1 | 30 | 9 | 11 | 0 | 7 | 4.1 | 2.5 |
| Optical Film 2 | 40 | 4 | 5 | 0 | 0 | 2.3 | 2.2 |
| Optical Film 3 | 30 | −1 | −1 | 0 | 1 | 3.4 | 3.3 |
| Optical Film 4 | 100 | 0 | 0 | 90 | 0 | 2.3 | 2.4 |
| Optical Film 5 | 20 | 9 | 11 | 0 | 9 | 5.3 | 2.9 |
| Optical Film 6 | 40 | 8 | 10 | 0 | 10 | 5.5 | 3.5 |
| Optical Film 7 | 20 | 9 | 11 | 0 | 7 | 5.4 | 3.1 |
| Optical Film 8 | 30 | 10 | 12 | 0 | 7 | 4.9 | 2.7 |

Examples 1 to 9, and Comparative Examples 1 to 3

<<2>> Production and Evaluation of Polarizer (Production of Polarizer)

1] Surface Treatment of Film

The optical films 1 and 5 to 8 and Fujitac TD60UL (by FUJIFILM) were immersed in an aqueous solution of 4.5 mol/L sodium hydroxide (saponification liquid) conditioned at 37° C. for 1 minute, then washed with water, thereafter immersed in an aqueous solution of 0.05 mol/L sulfuric acid for 30 seconds, and further led to pass through a washing tank. With that, these were processed for water removal three times with an air knife, from which water was thus removed, and thereafter kept staying in a drying zone at 70° C. for 15 seconds and were thus dried, thereby giving saponified optical films 1, 5 to 8 and Fujitac TD60UL.

The optical films 2 to 4 were processed for corona treatment on the surface thereof so that the contact angle of the surface with water could be 60°, thereby giving surface-treated optical films 2 to 4.

2] Production of Polarizing Film

According to Example 1 in JP-A 2001-141926, a polarizing film having a thickness of 20 μm was produced by giving thereto a peripheral speed difference between two pairs of nip rolls so as to be stretched in the machine direction.

3] Sticking

The polarizing film was sandwiched between two from the above-mentioned, saponified optical films or surface-treated optical films, and using an adhesive of an aqueous 3% PVA (Kuraray's PVA-117H) solution, these were stuck together in a roll-to-roll mode process in such a manner that the absorption axis of the polarizing film could be parallel to the machine direction of the optical films. Here, the film on one side of the polarizing film is any one of the optical films 1 to 8, and the film on the other side thereof is the saponified Fujitac TD60UL film.

In the experiment where the angle between the direction of the absorption axis of the polarizing film (polarizer) and the direction of the optical film in which the sound propagation velocity is the maximum could not be a desired angle in sticking the film in a roll-to-roll mode process, the films were batchwise stuck together to give a polarizer so that the angle between the direction of the absorption axis of the polarizing film and the direction of the optical film in which the sound propagation velocity is the maximum could be the angle as shown in Table 2.

(Evaluation of Polarizer)

1] ΔRth (pol)

Rth of the optical film contained in the polarizer that had been conditioned at 25° C. and at a relative humidity of 30% or 80% for 5 days was measured according to the above-mentioned method, and the difference between the data (value at 30%-value at 80%) is referred to as ΔRth (pol).

2] Initial Polarization Degree

The polarization degree of the above polarizer was calculated according to the above-mentioned method, and all the polarizers had a polarization degree of 99.9%.

black display state. After 24 hours, the panel was visually checked and evaluated for optical unevenness, if any, therein.

(Optical Unevenness Level in Front Direction after Durability Test)

In observation from the front thereof, the device was checked for optical unevenness (in other words, brightness unevenness) at the time of black level of display and was evaluated according to the following criteria.

AA: Little unevenness was seen visually in the environment at an illumination intensity of 20 lx.

A: Little unevenness was seen visually in the environment at an illumination intensity of 100 lx.

B: Some pale unevenness was seen visually in the environment at an illumination intensity of 100 lx.

C: Clear unevenness was seen visually in the environment at an illumination intensity of 100 lx.

D: Clear unevenness was seen visually in the environment at an illumination intensity of 300 lx.

The practicable level with no problem is A or B. A is preferred.

TABLE 2

| | Polarizer | Optical Film | Angle A (*1) [°] | Polarizer Punching Test before mounting on liquid-crystal display device | ΔRth(pol) [nm] | Mounting Evaluation after durability test |
|---|---|---|---|---|---|---|
| Example 1 | Polarizer 1 | 1 | 0 | A | 4 | AA |
| Comparative Example 1 | Polarizer 2 | 1 | 90 | A | 9 | C |
| Example 2 | Polarizer 3 | 2 | 0 | B | −2 | AA |
| Comparative Example 2 | Polarizer 4 | 3 | 0 | C | 0 | AA |
| Comparative Example 3 | Polarizer 5 | 4 | 90 | C | 0 | AA |
| Example 3 | Polarizer 6 | 5 | 0 | A | 7 | B |
| Example 4 | Polarizer 7 | 6 | 0 | A | 8 | B |
| Example 5 | Polarizer 8 | 7 | 0 | A | 5 | A |
| Example 6 | Polarizer 9 | 7 | 5 | A | 5 | A |
| Example 7 | Polarizer 10 | 7 | 10 | A | 6 | A |
| Example 8 | Polarizer 11 | 7 | 15 | A | 7 | B |
| Example 9 | Polarizer 12 | 8 | 0 | A | 5 | A |

(*1) Angle between the direction of the optical film in which the sound propagation velocity is the maximum and the direction of the absorption axis of the polarizing film 3] Polarizer Punching Test Before Mounting on Liquid-Crystal Display Device Using a 40 mm×40 mm Thomson cutter, the above polarizer was punched to give 100 pieces, and the pieces were checked for peeling or cracking, if any, at the edge faces thereof, and evaluated according to the following criteria.

A: None of 100 pieces peeled or cracked.

B: One or more peeled or cracked slightly.

C: Five or more peeled or cracked.

The practicable level with no problem is A or B. A is preferred.

In the test of mounting the polarizer on a liquid-crystal display device to be mentioned below, only the polarizers of Examples and Comparative Examples that had not peeled or cracked at the edge faces thereof were used.

4] Evaluation in Mounting on Liquid-Crystal Display Device (Mounting on IPS-Mode Liquid-Crystal Display Device)

The polarizers put on both sides of the liquid-crystal cell were peeled off from a commercial liquid-crystal television (IPS-mode flat-screen 42-type liquid-crystal television), and the polarizer produced in the above was re-stuck to the liquid-crystal cell via an adhesive, in such a manner that the optical film side of the polarizer could be on the liquid-crystal cell side. The obtained liquid-crystal television was kept in an environment at 50° C. and at a relative humidity of 80% for 5 days, and then transferred into an environment at 25° C. and at a relative humidity of 60%, and kept put on therein in a From the above Table 2, it is known that the polarizer of the present invention is excellent in working aptitude for punching, and, when mounted on a liquid-crystal display device, can protect the device from being troubled by optical unevenness that may be accompanied by environmental changes.

From Comparative Example 1, it is known that, when the angle between the direction of the optical film in which the sound propagation velocity is the maximum and the direction of the absorption axis of the polarizing film is more than the upper limit of the range defined in the present invention and when the optical film of the type is mounted on a liquid-crystal display device, then the device is obviously troubled by optical unevenness that may be accompanied by environmental changes.

From Comparative Example 2, it is known that when the absolute value of the photo-elastic coefficient C of the optical film is lower than the lower limit defined in the present invention, the optical film is poor in working aptitude for punching.

From Comparative Example 3, it is known that when the absolute value of the photo-elastic coefficient C of the optical film is lower than the lower limit defined in the present invention and when the angle between the direction of the optical film in which the sound propagation velocity is the maximum and the direction of the absorption axis of the polarizing film is more than the upper limit of the range defined in the present invention, then the optical film is poor in working aptitude for punching. The reason why the mounting evaluation in Comparative Example 3 differs from the evaluation described in the above Table 2 is because both ΔRth and the photo-elastic coefficient of the optical film are small and therefore the internal stress given to the optical film does not increase ΔRth (pol) and ΔRth (pol) of the film is low irrespective of the angle between the direction of the optical film in which the sound propagation velocity is the maxim and the direction of the absorption axis of the polarizing film.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2013-141733, filed Jul. 5, 2013, Japanese Patent Application No. 2014-108602, filed May 26, 2014, and Japanese Patent Application No. 2014-134558, filed Jun. 30, 2014, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. A polarizer comprising at least one optical film and at least one polarizing film, wherein:
an absolute value of a photo-elastic coefficient C of the optical film is $2\times10^{-12}$ $Pa^{-1}$ or more,
the optical film has an in-plane direction in which sound propagation velocity is the maximum, and
an angle between an in-plane direction in which the sound propagation velocity through the optical film is the maximum and a direction of an absorption axis of the polarizing film falls within a range of from 0° to less than 45°, and wherein:
the photo-elastic coefficient C of the optical film is a value measured in an environment at 25° C. and a relative humidity of 60%, at a wavelength of 590 nm, and the sound propagation velocity is a value measured in an environment at 25° C. and a relative humidity of 60%.

2. The polarizer according to claim 1, wherein an absolute value of a humidity dependence of thickness-direction retardation, ΔRth, of the optical film is 20 nm or less.

3. The polarizer according to claim 1, wherein the optical film satisfies a relationship of the following formula (1):

$$C \times \Delta Rth > 0 \quad (1)$$

wherein C indicates the photo-elastic coefficient of the optical film, and the photo-elastic coefficient C of the optical film is a value measured in an environment at 25° C. and a relative humidity of 60%, at a wavelength of 590 nm, and ΔRth indicates the humidity dependence of the thickness-direction retardation, Rth, of the optical film.

4. The polarizer according to claim 1, wherein a ratio of the sound propagation velocity in the in-plane direction of the optical film in which the sound propagation velocity through the optical film is the maximum and that in the direction orthogonal to the in-plane direction of the optical film in which the sound propagation velocity through the optical film is the maximum, or that is, the ratio of sound propagation velocity in the maximum direction/sound propagation velocity in the orthogonal direction is 1.1 or more.

5. The polarizer according to claim 1, wherein a thickness of the optical film is from 10 to 50 μm.

6. The polarizer according to claim 1, wherein the optical film is composed of a cellulose acylate resin or a cyclic polyolefin resin.

7. The polarizer according to claim 1, wherein an absolute value of the photo-elastic coefficient C of the optical film in the direction thereof in which the sound propagation velocity is the maximum is $2\times10^{-12}$ $Pa^{-1}$ or more, and wherein the photo-elastic coefficient C of the optical film is a value measured in an environment at 25° C. and a relative humidity of 60%, at a wavelength of 590 nm.

8. The polarizer according to claim 1, wherein an absolute value of the photo-elastic coefficient C of the optical film in the direction orthogonal to the in-plane direction in which the sound propagation velocity through the optical film is the maximum is $2\times10^{-12}$ $Pa^{-1}$ or more, and wherein the photo-elastic coefficient C of the optical film is a value measured in an environment at 25° C. and a relative humidity of 60%, at a wavelength of 590 nm.

9. A liquid-crystal display device containing a liquid-crystal cell and a polarizer comprising at least one optical film and at least one polarizing film, wherein:
an absolute value of a photo-elastic coefficient C of the optical film is $2\times10^{-12}$ $Pa^{-1}$ or more,
the optical film has an in-plane direction in which the sound propagation velocity is the maximum, and
an angle between the in-plane direction in which the sound propagation velocity through the optical film is the maximum and a direction of an absorption axis of the polarizing film falls within a range of from 0° to less than 45°, and wherein:
the photo-elastic coefficient C of the optical film is a value measured in an environment at 25° C. and a relative humidity of 60%, at a wavelength of 590 nm, and the sound propagation velocity is a value measured in an environment at 25° C. and a relative humidity of 60%.

10. The liquid-crystal display device according to claim 9, wherein the optical film is arranged between the polarizing film and the liquid-crystal cell.

11. The liquid-crystal display device according to claim 9, which further has a backlight and in which the polarizer is arranged on the backlight side or on the viewing side.

12. The liquid-crystal display device according to claim 9, wherein the liquid-crystal cell is a VA-mode or IPS-mode cell.

* * * * *